(12) United States Patent
Kimura et al.

(10) Patent No.: US 12,204,328 B2
(45) Date of Patent: Jan. 21, 2025

(54) WIRELESS MOBILITY DEVICE, CONTROL SYSTEM, METHOD AND PROGRAM

(71) Applicant: Nippon Telegraph and Telephone Corporation, Tokyo (JP)

(72) Inventors: Shuji Kimura, Musashino (JP); Ryo Nagaoka, Musashino (JP); Takato Toda, Musashino (JP); Nobuhiro Kimura, Musashino (JP); Takashi Yasunaga, Musashino (JP); Taichi Osada, Musashino (JP); Kaori Isagai, Musashino (JP); Yasuharu Yamashita, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 372 days.

(21) Appl. No.: 17/619,317

(22) PCT Filed: Jun. 19, 2019

(86) PCT No.: PCT/JP2019/024220
§ 371 (c)(1),
(2) Date: Dec. 15, 2021

(87) PCT Pub. No.: WO2020/255283
PCT Pub. Date: Dec. 24, 2020

(65) Prior Publication Data
US 2022/0365528 A1  Nov. 17, 2022

(51) Int. Cl.
*G05D 1/00* (2024.01)
*G10L 15/22* (2006.01)
*H04W 4/40* (2018.01)

(52) U.S. Cl.
CPC ............ *G05D 1/0022* (2013.01); *G10L 15/22* (2013.01); *B64U 2201/00* (2023.01); *G10L 2015/223* (2013.01); *H04W 4/40* (2018.02)

(58) Field of Classification Search
CPC .................. G05D 1/0022; G10L 15/22; G10L 2015/223; H04W 4/40; B64C 39/02; H04M 11/00; H04Q 9/00
See application file for complete search history.

(56) References Cited

FOREIGN PATENT DOCUMENTS

| CN | 110177330 A | * | 8/2019 | ............ H04W 4/025 |
|---|---|---|---|---|
| JP | 2003006532 | | 1/2003 | |
| JP | 2004229104 | | 8/2004 | |
| JP | 2005246502 | | 9/2005 | |
| JP | 2005246502 A | * | 9/2005 | |

OTHER PUBLICATIONS

JP2005246502 (A)—EPO machine translation (Year: 2005).*
CN110177330A—EPO machine translation (Year: 2019).*
(Continued)

*Primary Examiner* — Yuen Wong
(74) *Attorney, Agent, or Firm* — Fish & Richardson P.C.

(57) ABSTRACT

A wireless mobile object 1 includes: a response unit 32 that responds to a call received through a voice channel over a mobile communication network; and a control unit 36 that controls an action of the wireless mobile object, based on maneuver information received through the voice channel.

8 Claims, 9 Drawing Sheets

(56) References Cited

OTHER PUBLICATIONS

[No Author Listed] [online], "Flight rules for unmanned aerial vehicles (drone, radio-controlled aircraft, etc.)," Ministry of Land, Infrastructure, Transport and Tourism National Institute for Land and Infrastructure Management, available on or before Sep. 25, 2015, retrieved on Jun. 10, 2019, retrieved from URL <https://www.mlit.go.jp/koku/koku_tk10_000003.html>, 13 pages (with English Translation).

[No Author Listed] [online], "Guidelines for safe flight of unmanned aerial vehicles (drone, radio-controlled aircraft, etc.)," Ministry of Land, Infrastructure, Transport and Tourism National Institute for Land and Infrastructure Management, dated Apr. 26, 2019, retrieved from URL <https://www.mlit.go.jp/common/001287979.pdf>, 27 pages (with English Translation).

[No Author Listed] [online], "Safety management and basic operation of unmanned aerial vehicles (drones)," Ministry of Land, Infrastructure, Transport and Tourism National Institute for Land and Infrastructure Management, dated Aug. 8, 2018, retrieved from URL <https://www.col.mlit.go.jp/kenshu/H30-083-031.pdf>, 3 pages (with English Translation).

[No Author Listed] [online], "Seminars and qualifications sponsored by the Japan Drone Association," Japan Drone Association, available on or before May 11, 2015, retrieved on Jun. 10, 2019, retrieved from URL <https://www.alldrones.org/>, 21 pages (with English Translation).

\* cited by examiner

Fig. 4

| CONTROL SIGNAL | | MANEUVER INFORMATION |
|---|---|---|
| TONE SIGNAL | VOICE SIGNAL | |
| *1# | CLIMB, UP, GO UP | CLIMB |
| *2# | DESCEND, DOWN, GO DOWN | DESCENT |
| *3# | MOVE FORWARD, FORWARD, ADVANCE | FORWARD MOVEMENT |
| *4# | MOVE BACKWARD, MOVE BACK, BACK, RETURN | BACKWARD MOVEMENT |
| *5# | MOVE RIGHT, TO THE RIGHT | RIGHT MOVEMENT |
| *6# | MOVE LEFT, TO THE LEFT | LEFT MOVEMENT |
| *7# | ROTATE RIGHT, ROTATE TO THE RIGHT | RIGHT ROTATION |
| *8# | ROTATE LEFT, ROTATE TO THE LEFT | LEFT ROTATION |
| *13# | TAKE OFF | CLIMB + FORWARD MOVEMENT |
| *135# | CLIMB TO THE RIGHT | CLIMB + FORWARD MOVEMENT + RIGHT MOVEMENT |
| *1357# | TURN TO THE RIGHT | CLIMB + FORWARD MOVEMENT + RIGHT MOVEMENT + RIGHT ROTATION |
| ... | ... | ... |
| *0# | STAY, HALT, STOP, EMERGENCY STOP, LAND | STAY |

「*」CONTROL START KEY
「#」CONTROL END KEY

WIRELESS MOBILITY DEVICE, CONTROL SYSTEM, METHOD AND PROGRAM

CROSS-REFERENCE TO RELATED APPLICATIONS

This application is a National Stage application under 35 U.S.C. § 371 of International Application No. PCT/JP2019/024220, having an International Filing Date of Jun. 19, 2019. The disclosure of the prior application is considered part of the disclosure of this application, and is incorporated in its entirety into this application.

TECHNICAL FIELD

The present invention relates to a wireless mobile object, a control system, a control method, and a control program.

BACKGROUND ART

Methods for flying an unmanned aerial vehicle have been known (see Non-Patent Literatures 1 to 4).

CITATION LIST

Non-Patent Literature

Non-Patent Literature 1: "Flight rules on unmanned aerial vehicles (drones, radio-controlled aircraft, and the like) ", Ministry of Land, Infrastructure, Transport and Tourism, [online], [retrieved on Jun. 10, 2019], <URL: https://www.mlit.go.jp/koku/koku_tk10_000003.html>

Non-Patent Literature 2: "Guidelines for safe flight of unmanned aerial vehicles (drones, radio-controlled aircraft, and the like)", Ministry of Land, Infrastructure, Transport and Tourism, [online], [retrieved on Jun. 10, 2019], <URL: https://www.mlit.go.jp/common/001287979.pdf>

Non-Patent Literature 3: "Safety control and basic maneuvers of unmanned aerial vehicles (drones)", Training course by the Ministry of Land, Infrastructure, Transport and Tourism, [online], [retrieved on Jun. 10, 2019], <URL: https://www.col.mlit.go.jp/kenshu/H30-083-031.pdf>

Non-Patent Literature 4: Training and certification by Japan Drone Association, [on line], [retrieved on Jun. 10, 2019], <URL: https://www.alldrones.org/>

SUMMARY OF THE INVENTION

Technical Problem

Conventional unmanned aerial vehicles receive a signal via radio waves, and therefore have a problem of being out of action in an area where radio waves do not reach.

The present invention has been made in view of the above-described circumstances, and an object of the present invention is to provide a technology that makes it possible to reliably control an action of a wireless mobile object.

Means for Solving the Problem

A wireless mobile object according to an aspect of the present invention includes: a response unit that responds to a call received through a voice channel over a mobile communication network; and a control unit that controls an action of the wireless mobile object, based on maneuver information received through the voice channel.

A control system according to an aspect of the present invention is a control system including: a control apparatus; and a wireless mobile object, wherein the control apparatus includes a storage unit that stores translation information in which a plurality of different control signals and maneuver information pieces corresponding to the plurality of control signals, respectively, are associated with each other, a response unit that responds to a call received through a voice channel over a mobile communication network, a reception unit that receives a control signal received through the voice channel, a translation unit that translates the received control signal into maneuver information by using the translation information read from the storage unit, a calling unit that calls the wireless mobile object through a voice channel over the mobile communication network, and a control unit that transmits the maneuver information to the wireless mobile object through the voice channel, and the wireless mobile object includes a response unit that responds to a call from the control apparatus received through the voice channel over the mobile communication network, and a control unit that controls an action of the wireless mobile object, based on the maneuver information received through the voice channel.

A control method according to an aspect of the present invention is a control method performed by a wireless mobile object, including: by the wireless mobile object, responding to a call received through a voice channel over a mobile communication network; and controlling an own action, based on maneuver information received through the voice channel.

A control method according to an aspect of the present invention is a control method performed by a control apparatus and a wireless mobile object, including: by the control apparatus, storing, in a storage unit, translation information in which a plurality of different control signals and maneuver information pieces corresponding to the plurality of control signals, respectively, are associated with each other; responding to a call received through a voice channel over a mobile communication network; receiving a control signal received through the voice channel; translating the received control signal into maneuver information by using the translation information read from the storage unit; calling the wireless mobile object through a voice channel over the mobile communication network; and transmitting the maneuver information to the wireless mobile object through the voice channel, and by the wireless mobile object, responding to a call from the control apparatus received through the voice channel over the mobile communication network; and controlling an own action, based on the maneuver information received through the voice channel.

Another aspect of the present invention is a control program causing a computer to execute any one of the control methods.

Effects of the Invention

According to the present invention, a technology can be provided that makes it possible to reliably control an action of a wireless mobile object.

BRIEF DESCRIPTION OF DRAWINGS

FIG. 4 shows an example of data components of translation information.

DESCRIPTION OF EMBODIMENTS

Hereinafter, embodiments of the present invention will be described with reference to drawings. In description of the drawings, the same parts are denoted by the same reference signs, and the same description thereof will be omitted.

First Embodiment (Entire Configuration of Control System)

Figure 1:
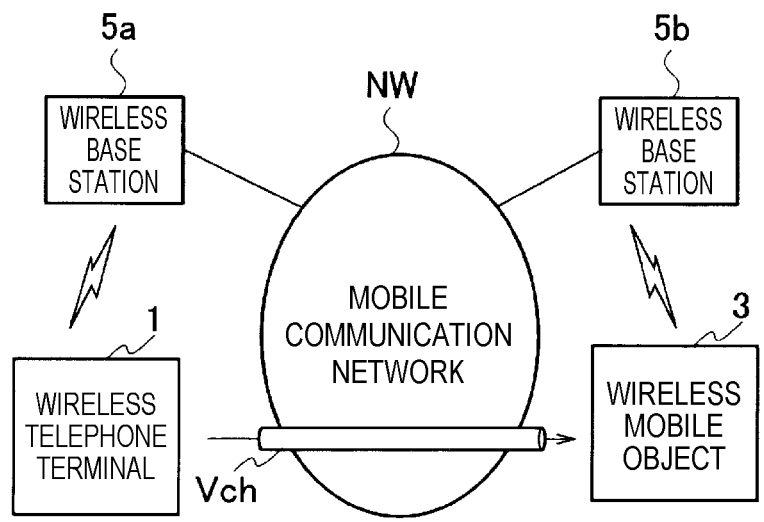
FIG. 1 is a configuration diagram showing an entirety of a control system in a first embodiment of the present invention.

FIG. 1 is a configuration diagram showing an entirety of a control system 100 in a first embodiment of the present invention. The control system 100 includes a wireless telephone terminal 1 that controls a wireless mobile object 3, and the wireless mobile object 3 that is maneuvered by the wireless telephone terminal 1. The wireless telephone terminal 1 phones the wireless mobile object 3 via a wireless base station 5a, a mobile communication network NW, and a wireless base station 5b. By phoning, the wireless telephone terminal 1 connects to the wireless mobile object 3 through a voice channel Vch over the mobile communication network NW. Thereafter, the wireless telephone terminal 1 controls an action of the wireless mobile object 3 by using the voice channel Vch.

A voice channel Vch is a circuit-switched channel. In addition to voice channels Vch, the mobile communication network NW includes data channels Dch that are packet-switched channels. In the present invention, a voice channel Vch is used. In a case of a data channel Dch, signal and data delays may occur when circuits are congested, and such delays may cause a delay to an action of the wireless mobile object 3. On the other hand, in a case of a voice channel Vch, since a circuit is dedicated over the mobile communication network NW, signal and data delays do not occur, and responsiveness of an action of the wireless mobile object 3 can be enhanced.

(Configuration of Wireless Telephone Terminal)

Figure 2:
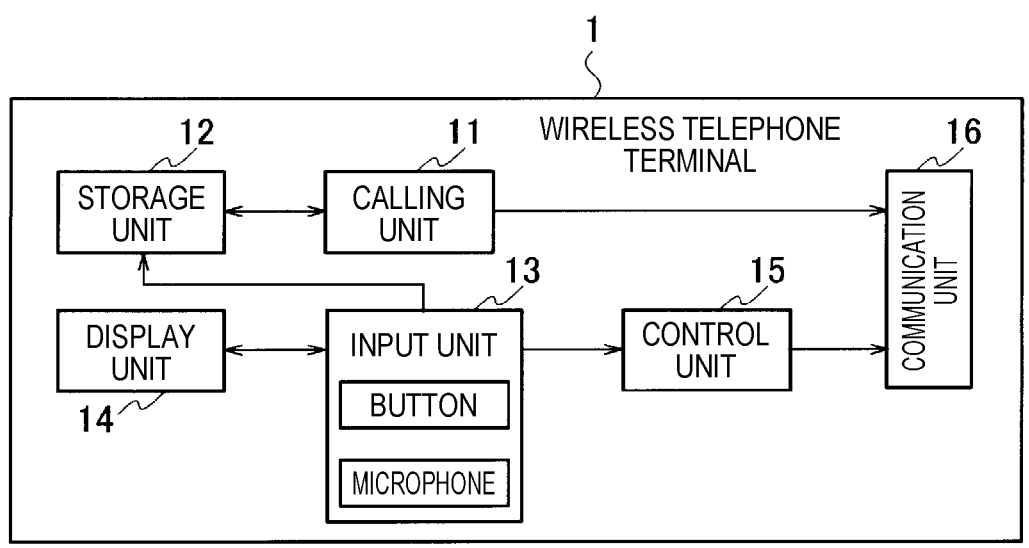
FIG. 2 is a block diagram showing a configuration of a wireless telephone terminal.

FIG. 2 is a block diagram showing a configuration of the wireless telephone terminal 1. The wireless telephone terminal 1 includes a calling unit 11, a storage unit 12, an input unit 13, a display unit 14, a control unit 15, and a communication unit 16.

The calling unit 11 includes a function of outputting a calling signal, through a voice channel Vch over the mobile communication network NW, to a telephone number of the wireless mobile object 3 inputted into the input unit 13. "Outputting a calling signal" is synonymous with phoning the wireless mobile object 3, or calling the wireless mobile object 3.

The storage unit 12 includes a function of storing input data such as a telephone number inputted into the input unit 13.

The input unit 13 includes, for example, a physical button, a touch panel button, a microphone, or the like, and includes a function of receiving input data inputted by a user. The "input data" includes the telephone number of the wireless mobile object 3 and maneuver information (for example, a data sequence created by combining any of symbols, numbers, and characters, or voice for maneuvering the wireless mobile object 3.

The display unit 14 includes a function of displaying the input data on a screen.

The control unit 15 includes a function of generating a control signal including the maneuver information and transmitting to the called wireless mobile object 3 through the voice channel Vch over the mobile communication network NW. The "control signal" is, for example, a tone signal including the above-mentioned data sequence, or a voice signal including the above-mentioned voice that is coded.

The communication unit 16 includes, for example, an antenna, a communication circuit, or the like, and includes a function of outputting, via radio waves, the calling signal outputted from the calling unit 11 and the control signal outputted from the control unit 15 to the called wireless mobile object 3 through the voice channel Vch over the mobile communication network NW.

The above-described wireless telephone terminal 1 can be implemented by using, for example, a mobile telephone, a smartphone terminal, or the like. Any terminal will do for the wireless telephone terminal 1 if the terminal is capable of communication based on circuit switching, and an existing wireless telephone terminal can be used as it is. Since the mobile communication network NW is connected also to a landline telephone network in general, an existing landline telephone terminal can also be used. In other words, for the wireless telephone terminal 1, a general-purpose telephone terminal, regardless of wireless or wired, can be used as it is as a controller.

(Configuration of Wireless Mobile Object)

Figure 3:
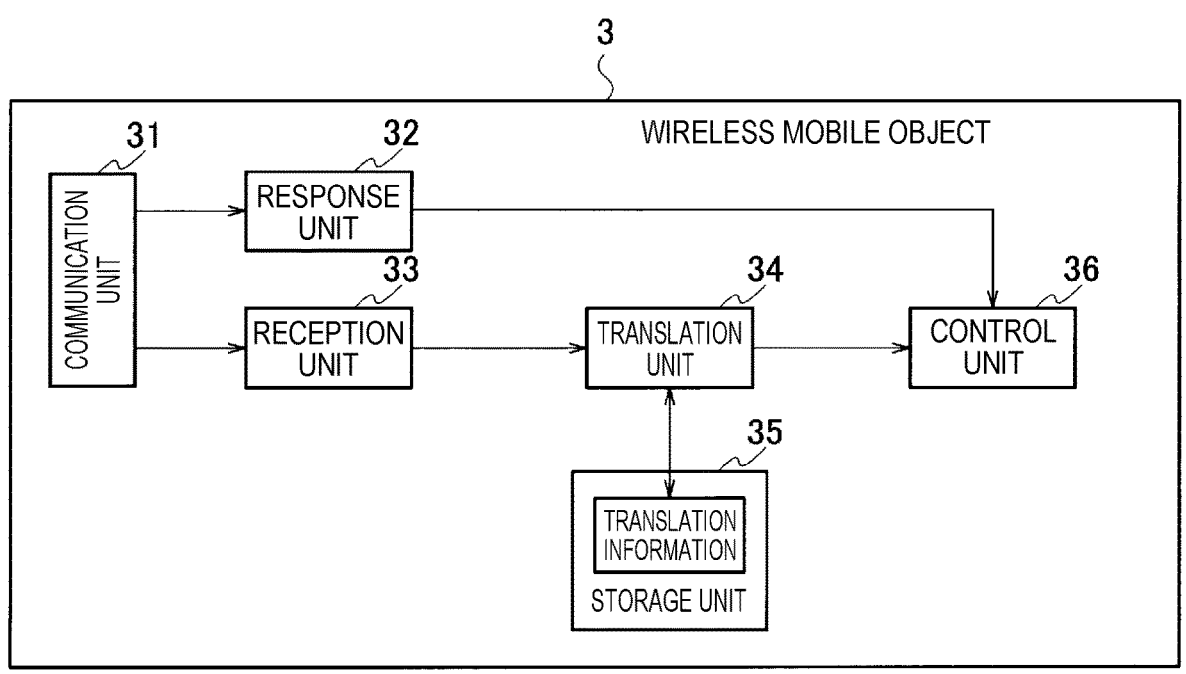
FIG. 3 is a block diagram showing a configuration of a wireless mobile object.

FIG. 3 is a block diagram showing a configuration of the wireless mobile object 3. The wireless mobile object 3 includes a communication unit 31, a response unit 32, a reception unit 33, a translation unit 34, a storage unit 35, and a control unit 36.

The communication unit 31 includes, for example, an antenna, a communication circuit, or the like, and includes a function of receiving, via radio waves, a calling signal and a control signal outputted from the wireless telephone terminal 1 through a voice channel Vch over the mobile communication network NW.

The response unit 32 includes a function of receiving the calling signal from the wireless telephone terminal 1 received through the voice channel Vch over the mobile communication network NW and responding to a call from the wireless telephone terminal 1.

The reception unit 33 includes a function of receiving the control signal from the wireless telephone terminal 1 received through the voice channel Vch over the mobile communication network NW.

The translation unit 34 includes a function of translating the control signal into maneuver information by using translation information read from the storage unit 35.

The storage unit 35 includes a function of storing the translation information in which a plurality of different control signals and maneuver information pieces corresponding to the plurality of control signals, respectively, are associated with each other. FIG. 4 shows an example of data components of the translation information. In the translation information, a content of each control signal (tone signal, voice signal) corresponding to each maneuver, respectively, is defined for each maneuver information piece for maneuvering the wireless mobile object 3.

The control unit 36 includes a function of activating the wireless mobile object 3 in response to the call from the wireless telephone terminal 1. The control unit 36 includes a function of controlling an action of the wireless mobile object 3, based on the maneuver information obtained through translation by the translation unit 34.

The above-described wireless mobile object 3 can be implemented by using, for example, an unmanned aerial vehicle (drone) including a computer. Any vehicle will do for the wireless mobile object 3 if the vehicle is capable of communication based on circuit switching, and such vehicles include, for example, a glider, a hot-air balloon, an airship, an airplane, a helicopter, a car, a ship, a submarine, and the like.

(Operation in Control System)

Figure 5:
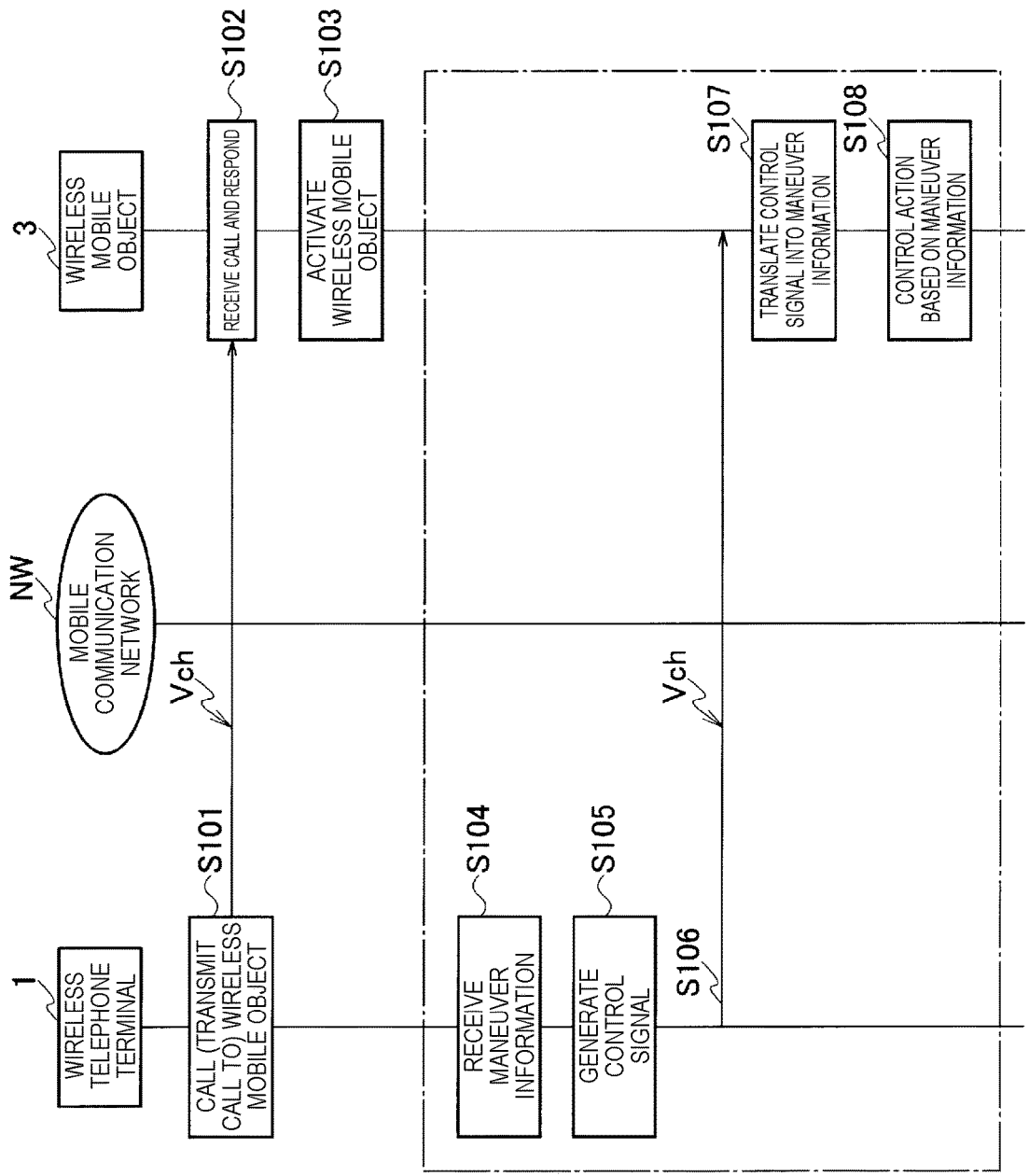
FIG. 5 is a sequence showing an example of operation in the control system.

FIG. 5 is a sequence showing an example of operation in the control system.

Step S101;

The wireless telephone terminal 1 calls the wireless mobile object 3 over the mobile communication network NW. For example, the input unit 13 receives the telephone number of the wireless mobile object 3 inputted by the user of the wireless telephone terminal 1 using the touch panel button. Thereafter, the calling unit 11 outputs a calling signal to the inputted telephone number of the wireless mobile object 3 through a voice channel Vch over the mobile communication network NW.

Step S102;

Next, the wireless mobile object 3 responds to a call from the wireless telephone terminal 1 over the mobile communication network NW. For example, the response unit 32 receives the calling signal from the wireless telephone terminal 1 received through the voice channel Vch over the mobile communication network NW, and responds to a call from the wireless telephone terminal 1.

Step S103;

Next, the wireless mobile object 3 activates the wireless mobile object 3. For example, in response to the call from the wireless telephone terminal 1, the control unit 36 brings about a standby state by starting an engine of the wireless mobile object 3.

Step S104;

Next, the wireless telephone terminal 1 receives maneuver information for the wireless mobile object 3. For example, the input unit 13 receives a data sequence created by combining a symbol and a number inputted by the user of the wireless telephone terminal 1 using the touch panel button. The data sequence inputted is a combination of a symbol and a number corresponding to a maneuver of the wireless mobile object 3 that the user desires to carry out. For example, when causing the wireless mobile object 3 to "climb", the user inputs "1#". "1" corresponds to a climb maneuver. "*" is a control start key. "#" is a control end key. When causing the wireless mobile object 3 to "move forward", the user inputs "*3#". "3" corresponds to a forward movement maneuver. When causing the wireless mobile object 3 to "climb" and "move forward", the user inputs "*13#" created by combining "1" and "3".

Step S105;

Next, the wireless telephone terminal 1 generates a control signal. For example, the control unit 15 generates a tone signal including the data sequence received in step S104.

Step S106;

Next, the wireless telephone terminal 1 transmits the control signal to the wireless mobile object 3 over the mobile communication network NW. For example, the control unit 15 transmits the tone signal generated in step S105 to the called wireless mobile object 3 through the voice channel Vch over the mobile communication network NW.

Step S107;

Next, the wireless mobile object 3 receives the control signal from the wireless telephone terminal 1 over the mobile communication network NW, and translates the control signal into maneuver information. For example, the translation unit 34 translates the tone signal from the wireless telephone terminal 1 into maneuver information by using the translation information read from the storage unit 35. When the tone signal is "*1#", the translation unit 24 translates the tone signal into maneuver information of "climb".

Step S108;

Lastly, the wireless mobile object 3 controls an own action based on the maneuver information. For example, the control unit 36 controls an action of the wireless mobile object 3, based on the maneuver information obtained through translation in step S107. In a case where the wireless mobile object 3 is a drone including four propellers, the control unit 36 increases rotational speed of all of the four propellers when the translation information is "climb".

The wireless telephone terminal 1 and the wireless mobile object 3 repeatedly perform steps S104 to S108 each time the user inputs maneuver information into the wireless telephone terminal 1 in step S104. Subsequently, a case will be described where the user maneuvers the wireless mobile object 3 via voice. In such a case, at the wireless telephone terminal 1, the input unit 13 receives a voice inputted by the user into the microphone (step S104). The control unit 15 generates a voice signal including the received voice that is coded (step S105). The control unit 15 transmits the voice signal to the called wireless mobile object 3 through the voice channel Vch over the mobile communication network NW (step S106). At the wireless mobile object 3, the translation unit 34 translates the voice signal from the wireless telephone terminal 1 into voice data, and then translates into maneuver information by using the translation information read from the storage unit 35 (step S107). The control unit 36 controls an action of the wireless mobile object 3, based on the maneuver information (step S108).

(Effects)

According to the first embodiment, the wireless mobile object 3 includes: the response unit 32 that responds to a call from the wireless telephone terminal 1 received through a voice channel Vch over the mobile communication network NW; and the control unit 36 that controls an action of the wireless mobile object 3, based on maneuver information included in a control signal received through the voice channel Vch over the mobile communication network NW. Since the wireless mobile object 3 can thus be controlled by using a general-purpose telephone terminal, a technology can be provided that makes it possible to reliably control an action of the wireless mobile object 3.

According to the first embodiment, since the wireless telephone terminal 1 connects to the wireless mobile object 3 through a voice channel Vch over the mobile communication network NW, a versatile existing telephone terminal can be used for the wireless telephone terminal 1. Through the voice channel Vch, basic maneuvers of the wireless telephone terminal 1 can be performed by using buttons (tone buttons) of an existing telephone terminal, and therefore can be performed by anyone. Accordingly, even when a skilled person who is familiar with maneuvering of the wireless mobile object 3 is absent, for example, in a disaster, the wireless mobile object 3 can be immediately put into action, and a situation of the disaster can be quickly grasped. Moreover, since a versatile existing telephone terminal can be used, a dedicated controller is not required, and consequently, the wireless mobile object 3 can be prevented from becoming uncontrollable due to breakage of a complicated control part of the wireless telephone terminal 1.

According to the first embodiment, since the wireless mobile object 3 controls an action based on a data sequence created by combining any of symbols, numbers, and characters, a complicated action can be accomplished by arbitrarily combining any of symbols, numbers, and characters.

According to the first embodiment, since the wireless mobile object 3 controls an action based on voice, a complicated action can be accomplished, and the wireless mobile object 3 can be easily maneuvered.

Second Embodiment (Entire Configuration of Control System)

Figure 6:
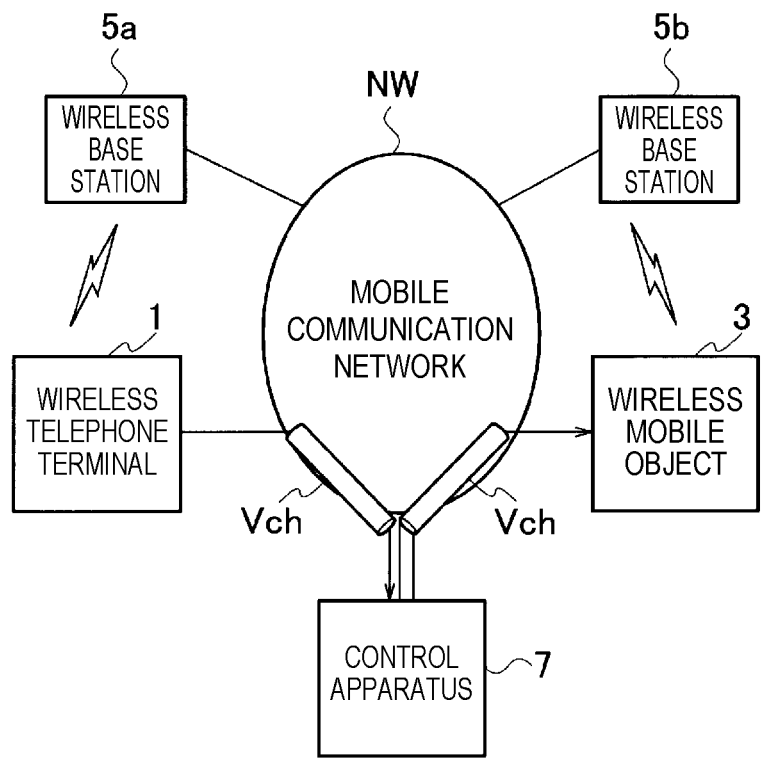
FIG. 6 is a configuration diagram showing an entirety of a control system in a second embodiment of the present invention.

FIG. 6 is a configuration diagram showing an entirety of a control system in a second embodiment of the present invention. The control system 100, in addition to the components of the control system 100 in the first embodiment shown in FIG. 1, further includes a control apparatus 7 connected to the mobile communication network NW. The control apparatus 7 receives a control signal from a wireless telephone terminal 1 through a voice channel Vch over the mobile communication network NW on one occasion, and translates the control signal into maneuver information and transmits to a wireless mobile object 3. In other words, in the second embodiment, the control apparatus 7 intermediately controls the wireless mobile object 3. Thus, convenience of maneuvering of the wireless mobile object 3 is enhanced, such as prior reservation of a maneuver of the wireless mobile object 3 becoming possible.

(Configuration of Wireless Telephone Terminal)

The wireless telephone terminal 1, similarly to the wireless telephone terminal 1 in the first embodiment as shown in FIG. 2, includes a calling unit 11, a storage unit 12, an input unit 13, a display unit 14, a control unit 15, and a communication unit 16.

The calling unit 11 includes a function of outputting a calling signal, through a voice channel Vch over the mobile communication network NW, to a telephone number of the control apparatus 7 inputted into the input unit 13. "Outputting a calling signal" is synonymous with phoning the control apparatus 7, or calling the control apparatus 7.

The storage unit 12 includes a function of storing input data such as a telephone number inputted into the input unit 13.

The input unit 13 includes, for example, a physical button, a touch panel button, a microphone, or the like, and includes a function of receiving input data inputted by a user. The "input data" includes the telephone number of the control apparatus 7, a telephone number of the wireless mobile object 3 that is a maneuver target, a reserved time for starting to maneuver the maneuver-target wireless mobile object 3, maneuver information (for example, a data sequence created by combining any of symbols, numbers, and characters, or voice) for maneuvering the wireless mobile object 3.

The display unit 14 includes a function of displaying the input data on a screen.

The control unit 15 includes a function of generating a tone signal including the telephone number of the maneuver-target wireless mobile object 3 (also including the reserved time if any; hereinafter, such a tone signal will be referred to as "maneuver target designation tone signal") and transmitting to the called control apparatus 7 through the voice channel Vch over the mobile communication network NW. The control unit 15 includes a function of generating a control signal including the maneuver information and transmitting to the called control apparatus 7 through the voice channel Vch over the mobile communication network NW. The "control signal" is, for example, a tone signal including the above-mentioned data sequence, or a voice signal including the above-mentioned voice.

(Configuration of Control Apparatus 7)

Figure 7:
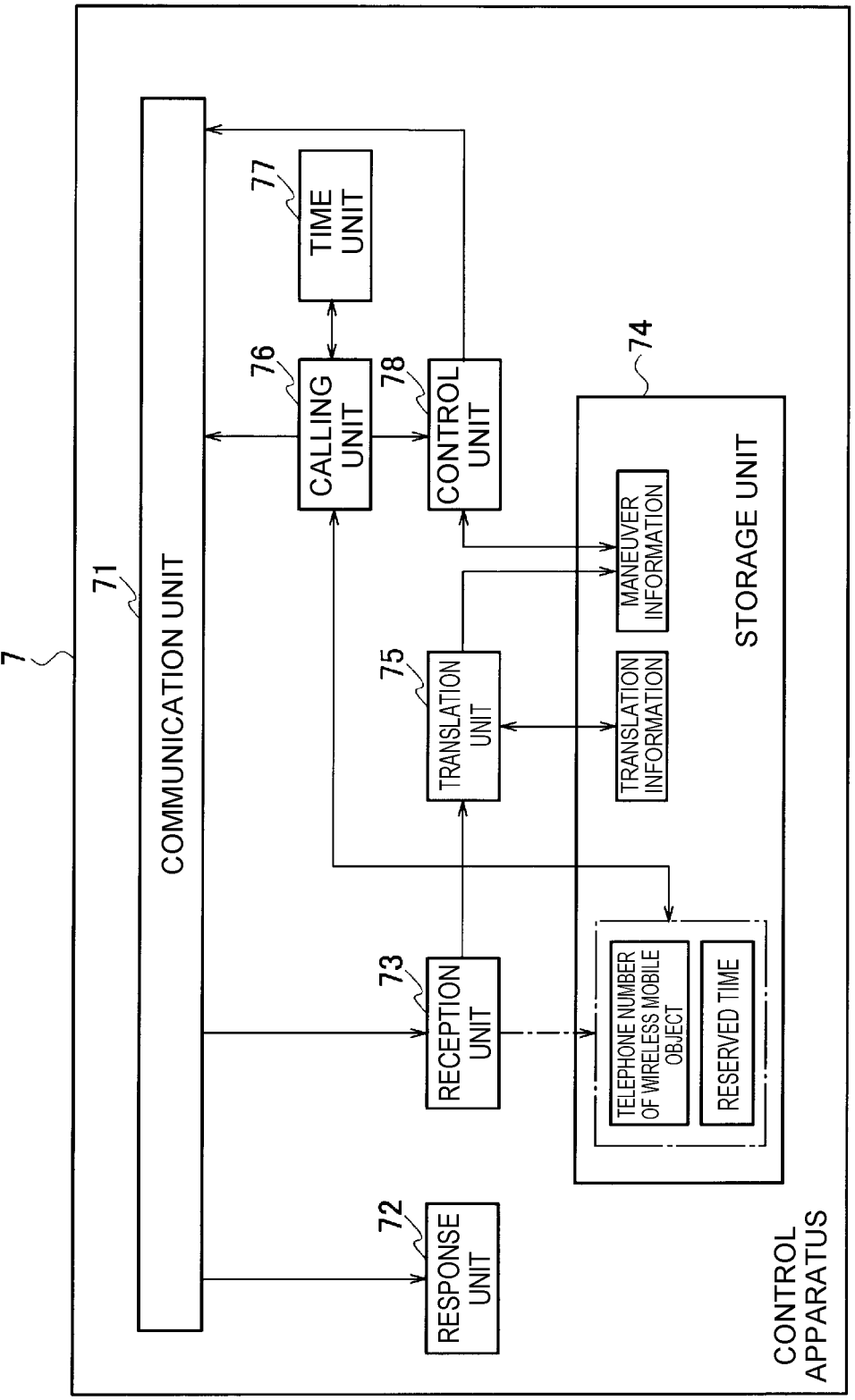
FIG. 7 is a block diagram showing a configuration of a control apparatus.

FIG. 7 is a block diagram showing a configuration of the control apparatus 7. The control apparatus 7 includes a communication unit 71, a response unit 72, a reception unit 73, a storage unit 74, a translation unit 75, a calling unit 76, a time unit 77, and a control unit 78.

The communication unit 71 includes, for example, an antenna, a communication circuit, or the like, and includes a function of receiving, via radio waves, a calling signal, a maneuver target designation tone signal, and a control signal outputted from the wireless telephone terminal 1 through a voice channel Vch over the mobile communication network NW. The communication unit 71 includes a function of outputting, via radio waves, a calling signal and a tone signal including maneuver information (hereinafter, referred to as "maneuver information tone signal") to the called wireless mobile object 3 through a voice channel Vch over the mobile communication network NW.

The response unit 72 includes a function of receiving the calling signal from the wireless telephone terminal 1 received through the voice channel Vch over the mobile communication network NW and responding to a call from wireless telephone terminal 1.

The reception unit 73 includes a function of receiving the maneuver target designation tone signal and the control signal from the wireless telephone terminal 1 received through the voice channel Vch over the mobile communication network NW. The reception unit 73 includes a function of storing the maneuver target designation tone signal into the storage unit 74 and outputting the control signal to the translation unit 75. The "maneuver target designation tone signal" includes the telephone number of the wireless mobile object 3 that is a maneuver target, and a reserved time for starting to maneuver the maneuver-target wireless mobile object 3, if any.

The storage unit 74 includes a function of storing the telephone number of the wireless mobile object 3. The storage unit 74 includes a function of storing the reserved time, if any, in association with the telephone number of the wireless mobile object 3. The storage unit 74 includes a function of storing translation information in which a plurality of different control signals and maneuver information pieces corresponding to the plurality of control signals, respectively, are associated with each other (see FIG. 4). The storage unit 74 includes a function of storing maneuver information obtained through translation by the translation unit 75.

The translation unit 75 includes a function of translating the control signal into maneuver information by using the translation information read from the storage unit 74, and storing the maneuver information in the storage unit 74 for a time being.

The calling unit 76 includes a function of reading the telephone number of the maneuver-target wireless mobile object 3 from the storage unit 74 and outputting a calling signal to the telephone number of the wireless mobile object 3 through the voice channel Vch over the mobile communication network NW. When the reserved time is associated with the telephone number of the wireless mobile object 3, the calling unit 76 includes a function of acquiring current time from the time unit 77 and, at a timing when the current time becomes the reserved time, outputting a calling signal. "Outputting a calling signal" is synonymous with phoning the wireless mobile object 3, or calling the wireless mobile object 3.

The time unit 77 includes a function of managing the current time. For example, the time unit 77 may acquire the current time externally by using NTP (Network Time Protocol), or may be a built-in clock.

The control unit 78 includes a function of, after the calling unit 76 outputs the calling signal, reading the maneuver information from the storage unit 74 and generating a maneuver information tone signal including the maneuver information. The control unit 78 includes a function of transmitting the maneuver information tone signal to the called wireless mobile object 3 through the voice channel Vch over the mobile communication network NW.

(Configuration of Wireless Mobile Object)

Figure 8:
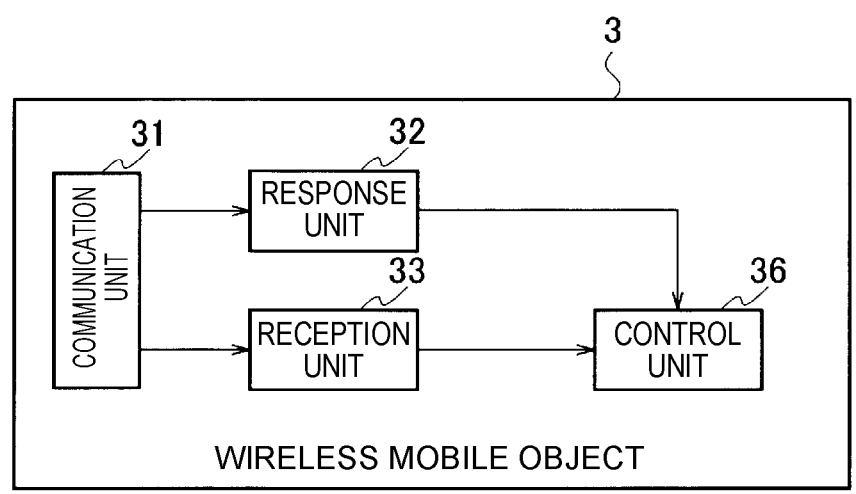
FIG. 8 is a block diagram showing a configuration of a wireless mobile object.

FIG. 8 is a block diagram showing a configuration of the wireless mobile object 3. The wireless mobile object 3 includes a communication unit 31, a response unit 32, a reception unit 33, and a control unit 36.

The communication unit 31 includes, for example, an antenna, a communication circuit, or the like, and includes a function of receiving, via radio waves, a calling signal and a maneuver information tone signal outputted from the control apparatus 7 through a voice channel Vch over the mobile communication network NW.

The response unit 32 includes a function of receiving the calling signal from the control apparatus 7 received through the voice channel Vch over the mobile communication network NW and responding to a call from the control apparatus 7.

The reception unit 33 includes a function of receiving the maneuver information tone signal from the control apparatus 7 received through the voice channel Vch over the mobile communication network NW.

The control unit 36 includes a function of activating the wireless mobile object 3 in response to the call from the control apparatus 7. The control unit 36 includes a function of acquiring maneuver information from the maneuver information tone signal and controlling an action of the wireless mobile object 3, based on the maneuver information.

(Operation in Control System)

Figure 9:
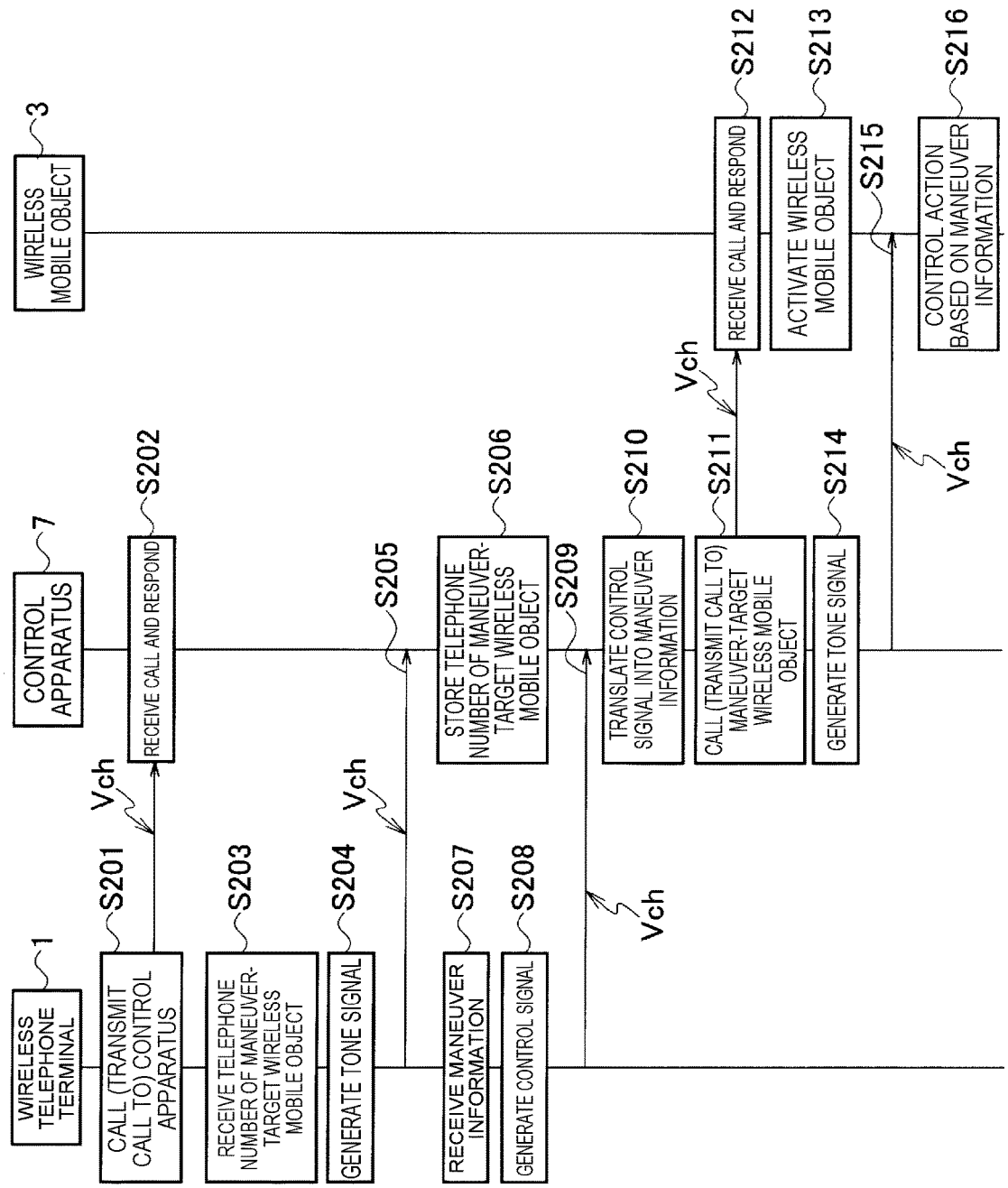
FIG. 9 is a sequence showing an example of operation in the control system.

FIG. 9 is a sequence showing an example of operation in the control system.

Step S201;

The wireless telephone terminal 1 calls the control apparatus 7 over the mobile communication network NW. For example, the input unit 13 receives the telephone number of the control apparatus 7 inputted by the user of the wireless telephone terminal 1 using the touch panel button. Thereafter, the calling unit 11 outputs a calling signal to the inputted telephone number of the control apparatus 7 through a voice channel Vch over the mobile communication network NW.

Step S202;

Next, the control apparatus 7 responds to a call from the wireless telephone terminal 1 over the mobile communication network NW. For example, the response unit 72 receives the calling signal from the wireless telephone terminal 1 received through the voice channel Vch over the mobile communication network NW, and responds to a call from the wireless telephone terminal 1.

Step S203;

Next, the wireless telephone terminal 1 receives the telephone number of the wireless mobile object 3 that is a maneuver target. For example, the input unit 13 receives the telephone number of the maneuver-target wireless mobile object 3 and a reserved time for starting to maneuver the wireless mobile object 3 inputted by the user of the wireless telephone terminal 1 using the touch panel button.

Step S204;

Next, the wireless telephone terminal 1 generates a maneuver target designation tone signal. For example, the control unit 15 generates a tone signal including the telephone number of the maneuver-target wireless mobile object 3 and the reserved time for starting to maneuver the wireless mobile object 3.

Step S205;

Next, the wireless telephone terminal 1 transmits the maneuver target designation tone signal to the wireless mobile object 3 over the mobile communication network NW. For example, the control unit 15 transmits the maneuver target designation tone signal generated in step S204 to the called control apparatus 7 through the voice channel Vch over the mobile communication network NW.

Step S206;

Next, the control apparatus 7 receives the maneuver target designation tone signal from the wireless telephone terminal 1 over the mobile communication network NW, and stores the maneuver target designation tone signal. For example, the reception unit 73 receives the maneuver target designation tone signal from the wireless telephone terminal 1, and stores, in the storage unit 74, the telephone number of the maneuver-target wireless mobile object 3 and the reserved time for starting to maneuver the wireless mobile object 3 included in the maneuver target designation tone signal.

Step S207;

Next, the wireless telephone terminal 1 receives maneuver information for the wireless mobile object 3. For example, the input unit 13 receives a data sequence created by combining a symbol and a number inputted by the user of the wireless telephone terminal 1 using the touch panel button. The data sequence inputted is a combination of a symbol and a number corresponding to a maneuver of the wireless mobile object 3 that the user desires to carry out.

Step S208;

Next, the wireless telephone terminal 1 generates a control signal. For example, the control unit 15 generates a tone signal including the data sequence received in step S207.

Step S209;

Next, the wireless telephone terminal 1 transmits the control signal to the wireless mobile object 3 over the mobile communication network NW. For example, the control unit 15 transmits the tone signal generated in step S208 to the called control apparatus 7 through the voice channel Vch over the mobile communication network NW.

Step S210;

Next, the control apparatus 7 receives the control signal from the wireless telephone terminal 1 over the mobile communication network NW, translates the control signal into maneuver information, and stores the maneuver information for a time being. For example, the translation unit 75 translates the tone signal from the wireless telephone terminal 1 into maneuver information by using the translation information read from the storage unit 74, and stores the maneuver information in the storage unit 74.

Step S211;

Next, the control apparatus 7 calls the wireless mobile object 3 over the mobile communication network NW at a timing of the reserved time. For example, the calling unit 76 reads the telephone number of the wireless mobile object 3 and the reserved time for starting to maneuver the wireless mobile object 3 from the storage unit 74, and, at a timing when the current time acquired from the time unit 77 becomes the reserved time, outputs a calling signal to the telephone number of the wireless mobile object 3 through a voice channel Vch over the mobile communication network NW.

Step S212;

Next, the wireless mobile object 3 responds to a call from the control apparatus 7 over the mobile communication network NW. For example, the response unit 32 receives the calling signal from the control apparatus 7 received through the voice channel Vch over the mobile communication network NW, and responds to a call from the control apparatus 7.

Step S213;

Next, the wireless mobile object 3 activates the wireless mobile object 3. For example, in response to the call from the control apparatus 7, the control unit 36 brings about a standby state by starting an engine of the wireless mobile object 3.

Step S214;

Next, the control apparatus 7 generates a maneuver information tone signal. For example, the control unit 78 generates a maneuver information tone signal including the maneuver information stored for the time being in the storage unit 74 in step S210.

Step S215;

Next, the control apparatus 7 transmits the maneuver information tone signal to the wireless mobile object 3 over the mobile communication network NW. For example, the control unit 78 transmits the maneuver information tone signal generated in step S214 to the called wireless mobile object 3 through the voice channel Vch over the mobile communication network NW.

Step S216;

Lastly, the wireless mobile object 3 receives the maneuver information tone signal from the control apparatus 7 over the mobile communication network NW, and controls an own action based on the maneuver information. For example, the control unit 78 acquires the maneuver information from the maneuver information tone signal, and controls an action of the wireless mobile object 3, based on the maneuver information.

Modification Example 1

In step S211, when no reserved time is stored, the control apparatus 7 may be configured to call the wireless mobile object 3 immediately after translating the control signal into maneuver information in step S210.

Modification Example 2

When the user maneuvers the wireless mobile object 3 via voice in step S207, the wireless telephone terminal 1 may be configured to generate a voice signal including a received voice that is coded. In such a case, in step S210, the control apparatus 7 may be configured to translate the voice signal into voice data and then translate into maneuver information by using the translation information read from the storage unit 74.

(Effects)

According to the second embodiment, the wireless mobile object 3 includes: the response unit 32 that responds to a call from the control apparatus 7 received through a voice channel Vch over the mobile communication network NW; and the control unit 36 that controls an action of the wireless mobile object 3, based on maneuver information included in a maneuver information tone signal received through the voice channel Vch over the mobile communication network NW. Since the wireless mobile object 3 can thus be controlled by using a general-purpose telephone terminal, a technology can be provided that makes it possible to reliably control an action of the wireless mobile object 3.

According to the second embodiment, since the control apparatus 7 maneuvers the wireless mobile object 3 at a timing when it becomes a reserved time, the wireless mobile object 3 can be maneuvered based on a reservation.

Matters Common in the Embodiments

Figure 10:
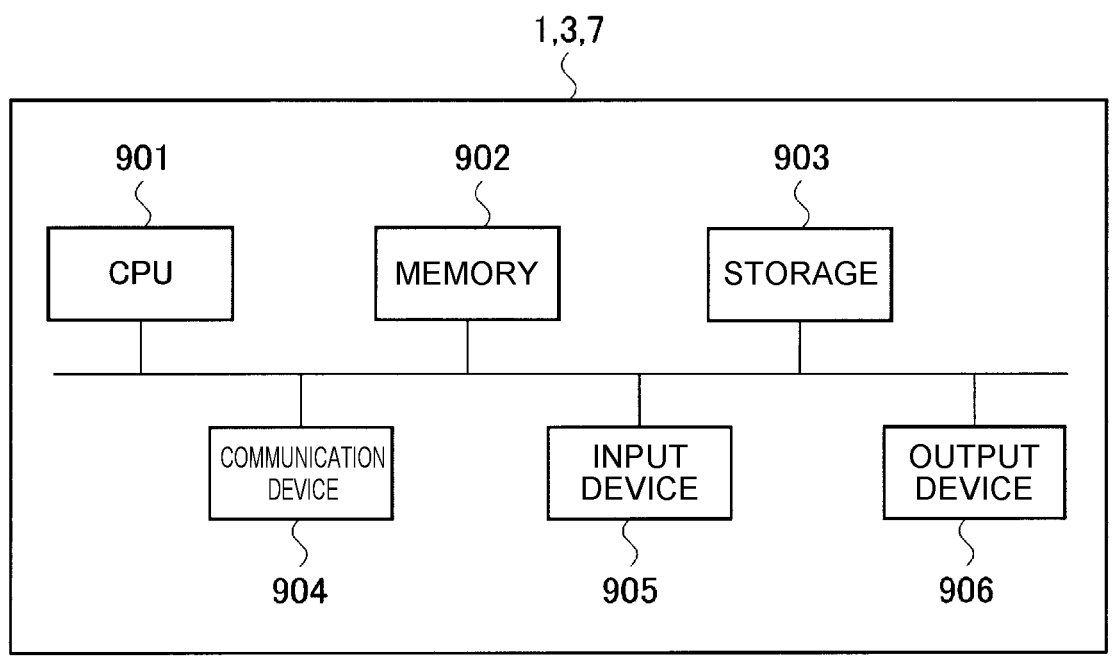
FIG. 10 is a hardware configuration diagram of a computer.

The present invention is not limited to the embodiments described above, and various changes can be made within the scope of the substances of the embodiments. For the wireless telephone terminal 1, the wireless mobile object 3, and the control apparatus 7 in any of the embodiments, for example, a general-purpose computer system can be used that includes a CPU (Central Processing Unit, processor) 901, a memory 902, a storage (Hard Disk Drive, Solid State Drive) 903, a communication device 904, an input device 905, and an output device 906 as shown in FIG. 10. The memory 902 and the storage 903 are storage devices. In the computer system, the CPU 901 executes a predetermined program loaded on the memory 902, whereby each function of the wireless telephone terminal 1, the wireless mobile object 3, and the control apparatus 7 is implemented.

Each of the wireless telephone terminal 1, the wireless mobile object 3, and the control apparatus 7 may be implemented by using a single computer, or may be implemented by using a plurality of computers. Each of the wireless telephone terminal 1, the wireless mobile object 3, and the control apparatus 7 may be a virtual machine implemented on a computer.

A program for each of the wireless telephone terminal 1, the wireless mobile object 3, and the control apparatus 7 can be stored in a computer-readable recording medium, such as HDD, SSD, USB (Universal Serial Bus) memory, CD (Compact Disc), or DVD (Digital Versatile Disc), or can be delivered over a network.

REFERENCE SIGNS LIST

1 Wireless telephone terminal
11 Calling unit
12 Storage unit

13 Input unit
14 Display unit
15 Control unit
16 Communication unit
3 Wireless mobile object
31 Communication unit
32 Response unit
33 Reception unit
34 Translation unit
35 Storage unit
36 Control unit
5a Wireless base station
5b Wireless base station
7 Control apparatus
71 Communication unit
72 Response unit
73 Reception unit
74 Storage unit
75 Translation unit
76 Calling unit
77 Time unit
78 Control unit
100 Control system
901 CPU
902 Memory
903 Storage
904 Communication device
905 Input device
906 Output device
NW Mobile communication network
Vch Voice channel

The invention claimed is:

1. A wireless mobile object comprising one or more processors configured to:
generate translation information by associating a plurality of different control signals with data representing maneuver information;
receive, over a voice channel over a mobile communication network and from a terminal, a call;
in response to receiving the call, activate the wireless mobile object by turning on an engine of the wireless mobile object;
receive, over the voice channel and from the terminal, a control signal;
translate the control signal into maneuver information, wherein the translating comprises identifying, from the generated translation information, maneuver information associated with the received control signal that corresponds to a stored control signal of the plurality of different control signals; and
control an action of the wireless mobile object based on the identified maneuver information.

2. The wireless mobile object according to claim 1, wherein the control signal is at least one of a tone signal including a data sequence of a symbol and a number, or a voice signal including voice.

3. The wireless mobile object according to claim 1, wherein the wireless mobile object is implemented on an unmanned aerial vehicle.

4. A control system comprising:
a control apparatus; and
a wireless mobile object,
wherein the control apparatus includes one or more processors configured to:
generate translation information by associating a plurality of different control signals with data representing maneuver information;
receive, over a voice channel over a mobile communication network and from a terminal, a call;
in response to receiving the call, activate the wireless mobile object by turning on an engine of the wireless mobile object;
receive, over the voice channel and from the terminal, a control signal;
translate the control signal into maneuver information, wherein the translating comprises identifying, from the generated translation information, maneuver information associated with the received control signal that corresponds to a stored control signal of the plurality of different control signals;
call the wireless mobile object through a voice channel over the mobile communication network;
transmit the maneuver information to the wireless mobile object through the voice channel; and
the wireless mobile object includes one or more processors configured to:
receive, over the voice channel of the mobile communication network, a call from the control apparatus; and
control an action of the wireless mobile object based on the identified maneuver information received through the voice channel.

5. The control system according to claim 4, wherein the one or more processors of the control apparatus is configured to call the wireless mobile object at a reserved time.

6. A non-transitory computer readable medium storing one or more instructions causing a computer to execute:
generating, in a control apparatus, translation information by associating a plurality of different control signals with data representing maneuver information;
receiving, over a voice channel over a mobile communication network and from a terminal, a call;
in response to receiving the call, activating a wireless mobile object by turning on an engine of the wireless mobile object;
receiving, over the voice channel and from the terminal, a control signal;
translating the control signal into maneuver information, wherein the translating comprises identifying, by the control apparatus, maneuver information associated with the received control signal that corresponds to a stored control signal of the plurality of different control signals;
calling, by the control apparatus, a wireless mobile object through a voice channel over the mobile communication network;
transmitting, by the control apparatus, the maneuver information to the wireless mobile object through the voice channel;
receiving, by a wireless mobile object and over the voice channel, a call from the control apparatus; and
controlling, by the wireless mobile object, an action based on the identified maneuver information received through the voice channel.

7. The non-transitory computer readable medium according to claim 6, comprising:
calling the wireless mobile object at a reserved time.

8. The non-transitory computer readable medium according to claim 6, wherein the control signal is at least one of a tone signal including a data sequence of a symbol and a number, or a voice signal including voice.

* * * * *